Aug. 2, 1949.                R. R. KILIAN                2,478,111
                           BAIT CASTING REEL
                         Filed Nov. 22, 1946
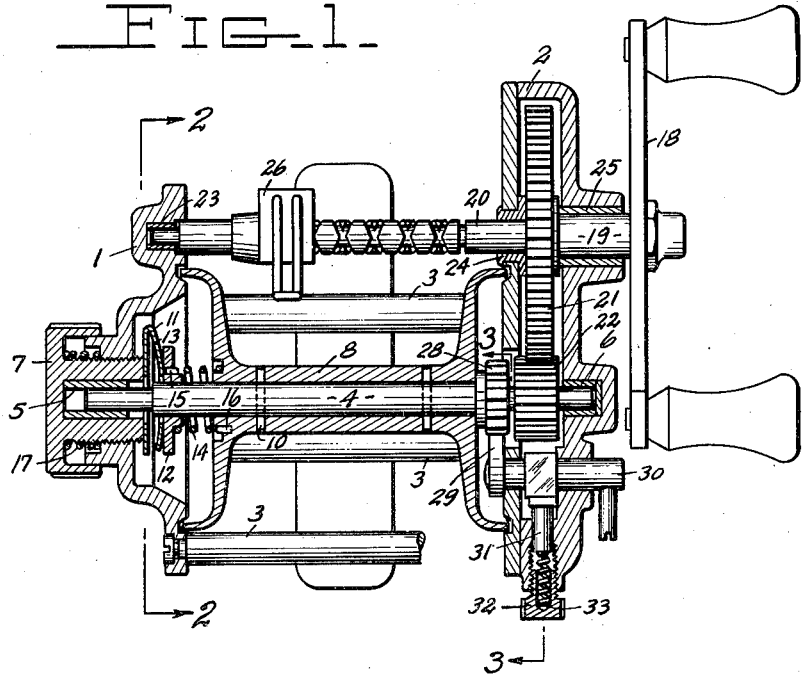
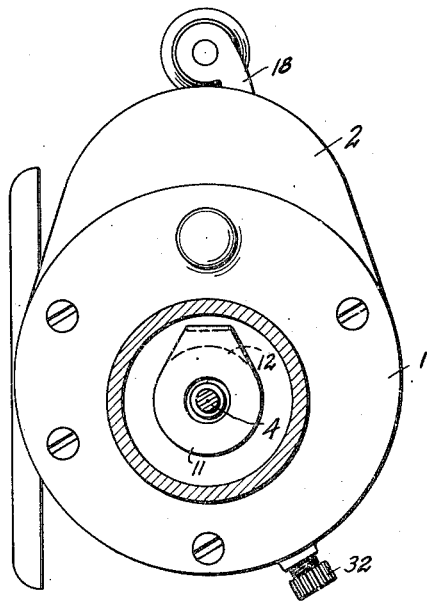
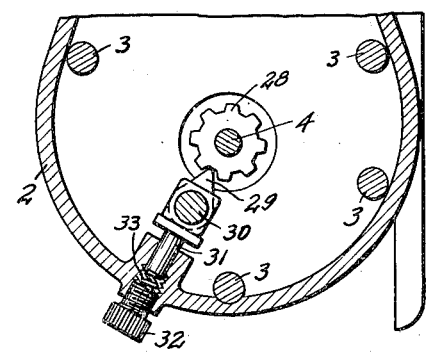
INVENTOR:
Rudolph R. Kilian,
BY
         Bodell + Thompson
                ATTORNEYS.

Patented Aug. 2, 1949

2,478,111

UNITED STATES PATENT OFFICE 2,478,111

BAIT CASTING REEL

Rudolph Robert Kilian, Baldwinsville, N. Y.

Application November 22, 1946, Serial No. 711,555

4 Claims. (Cl. 242—84.6)

This invention relates to fishing reels and also to bait casting fishing reels, and has for its object a particularly simple, economical and compact brake mechanism operated by the pull of the line when moving under the pull of a cast bait, to release, or partly release, the brake during casting, and to immediately apply the brake to the spool when the momentum of the bait decreases to the extent that slack would otherwise develop in the line.

The invention further has for its object a hand winding mechanism for the spindle on which the line spool is mounted, and for the shaft of the line guiding mechanism.

The invention consists in the novel features and in the combinations and constructions hereinafter set forth and claimed.

In describing this invention, reference is had to the accompanying drawings in which like characters designate corresponding parts in all the views.

Figure 1 is a longitudinal, sectional view, partly in elevation, of a fishing reel embodying this invention.

Figures 2 and 3 are sectional views taken respectively on lines 2—2 and 3—3, Figure 1.

The reel may be of any suitable form, size and construction. It includes a frame including opposing heads 1, 2, and tie rods 3 connecting them.

4 designates the spindle journalled in bearings 5, 6, supported by the heads 1, 2, respectively. The bearing 6 is mounted directly in the head 2, which is formed hollow, and the bearing 5 is in a plug member 7 constituting an abutment for one of the brake members, which abutment is carried by the head 1, as will be presently described.

8 is the line spool mounted on the spindle 4 between the heads 1, 2, and suitably connected to the spindle 4 to rotate therewith. In practise, it is pressed on the spindle 4, but it is here shown as keyed, or pinned, at 10 thereto.

In addition to the brake abutment 7, the brake mechanism includes brake members 11 and 12, the brake member 11 being resilient or, in effect, a cushion spring, and also thrusting against the abutment 7 so that any tendency to rotate is restrained. It is here shown as double, or as a resilient spring leaf folded upon itself with one of the sides 13 slightly convex. The member 12 is mounted on the spindle 4 beyond one head of the line spool, and is loosely mounted thereon so that the spindle 4 is rotatable, to some extent, relative to the brake member 12. The brake member 12 is normally pressed against the member 11, or the convex side 13 thereof, by an axially contractile spring means.

As illustrated, this means is a coiled torsion spring 14 coiled about the spindle 4 and anchored at 15 and 16 respectively to the clutch member 12 and to the opposing head of the line spool 8. The plug or abutment 7, which threads into the head 1, is adjustable axially to initially adjust the compression of the spring brake member 11. It is provided with a head on the outer side of the head 1 of the frame of the reel and is held from slipping by friction between the threads, facilitated by a spring 17 between the inner face of the head 7 and the opposing surface of the head 1. The bearing 5, previously referred to, is located in a bore in the abutment 7.

When casting, the pull on the bait rotates the line spool and in so doing, loads the torsion spring 14, causing it to contract and hence withdraw the brake member 12 from the brake member 11, thus releasing the braking effect on the spool, so that it unwinds, fairly freely under the pull of the bait on the line. When, however, the bait loses its momentum, the spool is prevented from rotating faster than the bait can take up the slack in the line, by the re-application of the brake member 12 due to the fact that the torsion spring, then being released of its torsional effect, again extends axially to its normal, or starting, position, and in so doing presses the brake member 12 against the brake member 11.

The spindle 4 is rotated to wind the line on the spool by a simple winding mechanism which does not develop looseness in the bearing on the winding shafts, as in conventional reels.

The winding mechanism for the spindle is here shown as the usual crank handle 18 mounted on a bushing 19 rotatable with the shaft 20 of the line guide mechanism, and a train of gears including a gear 21 and a pinion 22 on the spindle 4, with which the gear 21 meshes. The line guide shaft 20 is mounted in a suitable bearing 23 in the head 1, and in a bearing at 24 in one wall of the head 2, which is hollow, and also in a bearing 25 in which the bushing 19 is located.

By this actuating mechanism for the spindle 4, the various shafts have adequate bearings, and looseness in the crank handle does not develop, as in reels wherein the shaft, on which the crank is mounted, is connected by one train of gears to the line guide shaft, and by another train of gears to the actuating spindle for the line spool. All of the bearings are of the oil-less type.

The line guide mechanism is of the conventional construction, the shaft being provided with right and left intersecting grooves, or threads, which are joined at their ends, the follower 26, which feeds in opposite directions along the shaft 20, having a pin movable in the grooves, or threads, of the shaft 20. The line guide slidably interlocks with one of the tie rods 3 in the usual manner.

The clicking mechanism includes a toothed or ratchet wheel 28 mounted on the spindle 4 between the inner wall of the head 2 of the frame and the opposing head of the line spool, an oscillating clicker, or pawl, 29 mounted on a rock shaft 30 mounted in the head 2 in the double walls thereof, and having a non-circular portion with flat sides between the double walls, and a sliding detent 31 guided in the peripheral wall of the head 2 against the action of a compression spring 33 located between the end of the detent 31 and an adjusting screw threaded into the guide passage in which the detent slides, the screw head projecting beyond the periphery of the hollow head 2.

The rock shaft 30 is provided with a handle at its outer end for rocking the shaft far enough to carry the clicking pawl 29 out of engagement with the toothed wheel 28 to release the clicking member and hence, release any braking effect thereof on the line spool 9 so that the spool can run free. The braking effect can be regulated by turning the screw 32.

What I claim is:

1. A bait casting reel including a frame, a spindle rotatably mounted in the frame, a line spool mounted on the spindle to rotate therewith, means for turning the spindle, and a brake including opposing members concentric with the spindle, one being restrained from rotating movement, and the other mounted on the spindle and shiftable axially, the spindle being capable of rotative movement relative thereto, and axially contractile resilient means anchored to the shiftable brake member and to the spool and operable to contract and release the brake under the rotation of the spool effected by the pull of the bait.

2. In a bait casting fishing reel, a frame, a spindle mounted in the frame, a line spool mounted on the spindle to rotate therewith, means for rotating the spindle and brake means including a brake member mounted on the spindle and shiftable axially, the spindle being capable of rotative movement relatively to the brake member, and a torsion spring operating to press the brake member into engaged position and anchored at its opposite ends to the shiftable brake member and to the spool, and operating to contract under turning of the line spool under the pull of the bait on the line and hence, release the brake member.

3. In a bait casting fishing reel, a frame, a spindle mounted in the frame, a line spool mounted on the spindle to rotate therewith, and means for rotating the spindle to wind the line on the spool, a brake including a resilient cushioning member arranged to press in a direction axially of the spindle, a second member concentric with the spindle and coacting with the former member, the spindle having a rotative movement relatively to the second brake member, and a lineally contractile torsion spring between the second brake member and the spool and anchored at its opposite ends thereto.

4. In a bait casting fishing reel, a frame, a spindle mounted in the frame, a line spool mounted on the spindle to rotate therewith, and means for rotating the spindle to wind the line on the spool, a brake including a resilient cushioning member arranged to press in a direction axially of the spindle, a second member concentric with the spindle and coacting with the former member, the spindle having a rotative movement relatively to the brake member, a torsion spring between the second brake member and the spool and anchored at its opposite ends thereto, and an abutment for the resilient brake member mounted concentric with the spindle and operable to adjust the initial resiliency of said resilient brake member.

RUDOLPH ROBERT KILIAN.

REFERENCES CITED

The following references are of record in the file of this patent:

UNITED STATES PATENTS

| Number | Name | Date |
|---|---|---|
| 2,176,247 | Coxe | Oct. 17, 1939 |
| 2,181,259 | Balz et al. | Nov. 28, 1939 |

FOREIGN PATENTS

| Number | Country | Date |
|---|---|---|
| 132,670 | Great Britain | Sept. 25, 1919 |